(12) United States Patent
O'Rourke et al.

(10) Patent No.: US 9,375,965 B2
(45) Date of Patent: Jun. 28, 2016

(54) MARKING COMPOUND

(76) Inventors: Adam O'Rourke, Chesire (GB); Martin Walker, Chesire (GB); Richard Cook, Chesire (GB); Anthony Jarvis, Chesire (GB)

( * ) Notice: Subject to any disclaimer, the term of this patent is extended or adjusted under 35 U.S.C. 154(b) by 0 days.

(21) Appl. No.: 14/127,156

(22) PCT Filed: Aug. 12, 2011

(86) PCT No.: PCT/EP2011/063913
§ 371 (c)(1),
(2), (4) Date: Jan. 31, 2014

(87) PCT Pub. No.: WO2013/023673
PCT Pub. Date: Feb. 21, 2013

(65) Prior Publication Data
US 2014/0147392 A1    May 29, 2014

(51) Int. Cl.
  *B41M 5/32*    (2006.01)
  *B41M 5/26*    (2006.01)
  *B41M 5/28*    (2006.01)
  *C09D 11/50*   (2014.01)

(52) U.S. Cl.
CPC ............ *B41M 5/32* (2013.01); *B41M 5/267* (2013.01); *B41M 5/283* (2013.01); *C09D 11/50* (2013.01)

(58) Field of Classification Search
CPC ......... B41M 5/32; B41M 5/267; B41M 5/283
USPC .......... 424/455, 646, 655; 564/281, 291, 292; 430/8, 9, 17, 270.1, 289.1, 328, 330, 430/350, 495.1, 523, 541; 556/42, 57
See application file for complete search history.

(56) References Cited

U.S. PATENT DOCUMENTS

| | | | |
|---|---|---|---|
| 5,319,119 A | 6/1994 | Kaneshima et al. | |
| 8,105,506 B2 * | 1/2012 | Khan | B41M 5/267 252/512 |
| 2008/0207444 A1 | 8/2008 | O'Donoghue et al. | |

FOREIGN PATENT DOCUMENTS

| | | | |
|---|---|---|---|
| EP | 0 284 000 A2 | 9/1988 | |
| EP | 0284000 | 9/1988 | |
| EP | 0284000 A2 * | 9/1988 | ............. C07C 87/30 |
| EP | 0 575 805 A1 | 12/1993 | |
| EP | 0575805 | 12/1993 | |
| EP | 1861472 B1 | 10/2009 | |
| JP | 61-267059 | 11/1986 | |
| JP | 61 267059 A | 11/1986 | |
| RU | 2049788 C1 | 12/1995 | |
| RU | 2394691 C2 | 7/2010 | |
| RU | 2394891 C2 | 7/2010 | |
| RU | 2417242 C2 | 4/2011 | |
| WO | WO2005068207 A1 * | 7/2005 | ............... B41M 5/26 |
| WO | WO 2007/012578 | 2/2007 | |
| WO | WO2007012578 A1 * | 2/2007 | ............... B41M 5/26 |
| WO | WO 2007/141522 | 12/2007 | |
| WO | WO 2007/141522 A1 | 12/2007 | |
| WO | WO2007141522 A1 * | 12/2007 | ............. C07D 11/00 |

OTHER PUBLICATIONS

Wang et al., New synthetic route of polyoxometalate-based hybrids in choline chloride/urea eutectic media, 1020; Inorganica Chimica Acta, 363:1556-1560.*
Wang et al., New synthetic route of polyoxometalate-based hybrids in choline chloride/urea eutectic media, 2010, Inorganica Chimica Acta, 363:1556-1560.*
Wang et al., "New synthetic route of polyoxometalate-based hybrids in choline chloride/urea eutectic media,", 2012, Inorganica Chimica Acta, 363:1556-1560.*
Shi-Ming Wang et al., "New synthetic route of polyoxometalate-based hybrids in choline chloride/urea eutectic media", Inorganica Chimica Acta 363 (2010) 1556-1560.
International Search Report issued by the EPO in corresponding International Application No. PCT/EP2011/063913, dated Aug. 24, 2012 (3 pages).
Wang, Shi-Ming et al., "New Synthetic Route of Polyoxometalate-based Hybrids in Choline Chloride/Urea Eutetic Media," Inorganica Chimica ACTA, vol. 363, No. 7, Apr. 1, 2010 (pp. 1556-1560).

* cited by examiner

*Primary Examiner* — Jane C Oswecki
(74) *Attorney, Agent, or Firm* — Finnegan, Henderson, Farabow, Garrett & Dunner LLP

(57) ABSTRACT

Water soluble marking compounds comprising a transition metal oxyanion and at least one ammonium cation, comprising a nitrogen atom at least one further group selected from the group consisting of OH, COOH, NH2, NHC$_{1-5}$ alkyl, and N(C$_{1-5}$ alkyl)$_2$, wherein the two C$_{1-5}$ alkyl may be the same type of alkyl or different alkyls, may be used to obtain clear imageable coatings.

9 Claims, No Drawings

MARKING COMPOUND

CROSS-REFERENCE TO RELATED APPLICATIONS

This is a U.S. National Phase Application of International Application No. PCT/EP2011/063913, filed Aug. 12, 2011, which is incorporated herein by reference.

FIELD OF THE INVENTION

The present invention relates to marking compounds, compositions, i.e. ink formulations, comprising such marking compounds, and their use in laser marking applications. Specifically, the present invention relates to water soluble marking compounds comprising transition metal oxyanions.

BACKGROUND

In the art various proposals have been made to achieve effective printing on substrates by causing a change of color in the substrate on which the printing is to appear.

Various marking components, i.e. activatable pigments, have been proposed, which may be used to mark a substrate upon application of laser energy. As an example, WO 02/01250 discloses the use of oxymetal salts, such as ammonium octamolybdate (AOM), in laser marking.

However, as recognized in the art, laser imageable aqueous compositions based on AOM suffer from giving rise to an opaque coating before activation.

Use of organic soluble amine molybdates in organic solvents to provide transparent coatings suitable for use in color change laser imaging applications is taught in WO 2004/043704. However, organic solvent based compositions, particularly those containing VOCs, are becoming less and less environmentally acceptable and consequently there is a need for water based alternatives that retain the excellent transparency properties exhibited by solvent based systems.

WO 2008/075101 teaches laser imageable alkaline formulations, typically non-aqueous, comprising an off-white dispersion of molybdenum trioxide and sensitizing compound.

EP 1 907 218 teaches water based laser imageable formulations comprising oxygen containing transition metal compounds and additives selected from the groups consisting of organic acids, polyhydroxy compounds and bases. In the case of bases, a stoichiometric excess should be used.

Thus, there is a need within the art for clear laser imageable aqueous compositions.

SUMMARY

Consequently, the present invention seeks to mitigate, alleviate, eliminate or circumvent one or more of the above-identified deficiencies in the art and disadvantages singly or in any combination by providing a compound comprising:

(i) a transition metal oxyanion of formula $A_xO_y^{z-}$, "x" is an integer of 1 to 18, such as being 7 or 8; "y" is an integer of 4 to 42, such as being 24 or 26; "z" is an integer of 1 to 12, such as being 4 or 6; and; and "A" is a transition metal selected from the group consisting of Mo (molybdenum), Cr (chromium), W (tungsten), Va (vanadium); preferably "A" is Mo (molybdenum);

(ii) at least one, such as 1, 2, 3, or 4, ammonium cation(s) comprising a nitrogen atom and at least one further group selected from the group consisting of OH, COOH, NH2, $NHC_{1-5}$ alkyl, and $N(C_{1-5}$ alkyl$)_2$, wherein the two $C_{1-5}$ alkyl may be the same type of alkyl or different alkyls;

(iii) optionally one or several $NH_4^-$ cations; and (iv) optionally one or several molecules of water. Such a compound is water soluble and may thus be used to obtain transparent coated imageable substrates.

A preferred type of such a compound may be obtained by adding molybdenum (VI) oxide, ammonium chloride and triethanolamine to an aqueous solvent. Subsequently, the resulting mixture may heated. Then may isopropyl alcohol be added and the thus precipitated crystal isolated.

Further aspects of the invention do accordingly relate to a composition comprising such a compound and an aqueous solvent, as well as s substrate coated with such a composition. Examples of substrates that may be coated with the compositions include paper, cardboard, corrugated paper board, plastic film, ridged plastic parts, textile, wood, metal, glass, leather, foodstuff, and solid pharmaceutical compositions Furthermore, once coated the substrate may over laminated by a polyolefin Another aspect of the inventions relates to a process for marking such a coated substrate. In such a process, those parts of the coated substrate, where a marking is intended, is exposed to light in the wavelength range from 100 nm to 20,000 nm in order to generate a marking. The light may supplied by various means including laser, such as a laser operating in the wavelength range 700 to 2500 nm.

Further advantageous features of the invention are defined in the dependent claims. In addition, advantageous features of the invention are elaborated in embodiments disclosed herein.

DETAILED SUMMARY OF PREFERRED EMBODIMENTS

It has been found that water soluble marking compounds may be obtained may be obtained by replacing ammonium ($NH_4^+$) in compounds comprising transition metal oxyanion with an ammonium cation comprising a nitrogen atom at least one further group selected from the group consisting of OH, COOH, NH2, $NHC_{1-5}$ alkyl, and $N(C_{1-5}$ alkyl$)_2$, wherein the two $C_{1-5}$ alkyl may be the same type of alkyl or different alkyls. The additional group(s) in the ammonium cation has been found to provide the marking compounds with improved solubility in water.

Thus, clear aqueous ink formulations may be obtained by dissolving such marking compounds in aqueous solutions. Substrates coated with such compositions, will, in contrast to surfaces coated with aqueous dispersions of AOM (cf. WO 02/01250), be clear, i.e. not opaque. In addition, the viscosity of such inc compositions have been found to be suitable for printing by use of printing techniques used in the art, such as flexo printing.

Further, such coatings obtained by use of aqueous ink formulations comprising marking compounds disclosed herein provide substantially visible light-transparent and essentially colorless coatings on substrates. Such coatings are thermally sensitive and find utility in thermally driven color change and imaging applications, such as coding and marking; using for example: thermal light sources such as, bulb/mask arrangements, scanning lasers, diode arrays, or thermal contact printers, provide effective imaging, without opacification in the non-image areas.

Furthermore, the aqueous solubility properties of the marking compounds permit the avoidance of the time-consuming, wasteful and costly milling processes normally involved in the preparation of coating mixtures for known thermally sensitive imaging materials. They also allow thermally sensitive layers of good transparency and gloss, that are essentially colorless, to be made on transparent substrates such as: PET, BOPP and cellulose based films, and it allows the thermally sensitive layers to be applied to pre-printed substrates with only a negligible effect on the appearance of said substrate.

Accordingly, an embodiment relates to a compound comprising: a transition metal oxyanion of formula $A_xO_y^{z-}$, wherein "x" is an integer of 1 to 18, such as being 7 or 8; "y" is an integer of 4 to 42, such as being 24 or 26; "z" is an integer of 1 to 12, such as being 4 or 6; and "A" is a transition metal selected from the group consisting of Mo (molybdenum), Cr (chromium), W (tungsten), and Va (vanadium); preferably "A" is Mo (molybdenum); and at least one, such as 1, 2, 3, or 4, ammonium cation(s) comprising a nitrogen atom and at least one further group selected from the group consisting of OH, COOH, NH2, NHC$_{1-5}$ alkyl, and N(C$_{1-5}$ alkyl)$_2$, wherein the two C$_{1-5}$ alkyl may be the same type of alkyl or different alkyls. While the transition metal oxyanion provides the compound with heat driven image forming properties, the ammonium cation provides the compound with aqueous solubility. The compound may further comprise one or several NH$_4^+$ cations. However, in order to have sufficient water solubility the number of NH$_4^+$ cations not exceed the number of ammonium cations comprising at least one group selected from the group consisting of OH, COOH, NH2, NHC$_{1-5}$ alkyl, N(C$_{1-5}$ alkyl)$_2$, wherein the two C$_{1-5}$ alkyl may be the same type of alkyl or different alkyls. Preferably, the number of ammonium cations comprising at least one group selected from the group consisting of OH, COOH, NH2, NHC$_{1-5}$ alkyl, N(C$_{1-5}$ alkyl)$_2$, wherein the two C$_{1-5}$ alkyl may be the same type of alkyl or different alkyls exceeds the number of NH$_4^+$ cations, if present. In addition, the compound may further comprise one or several molecules of water.

It is to be noted that ammonium cations, wherein the further group is selected from the group consisting of NH2, NHC$_{1-5}$ alkyl, and N(C$_{1-5}$ alkyl)$_2$, will comprise at least two nitrogen atoms.

Although, other transition metals than molybdenum also may provide heat driven image forming properties, it is preferred if the transition metal oxyanion is a molybdenum oxyanion. Especially, the molybdenum oxyanion may be a molybdate (VI) anion, such as a heptamolybdate anion ($Mo_7O_{24}^{-6}$) or an octamolybdate anion ($Mo_8O_{26}^{-4}$). Most preferred is the molybdate (VI) anion an octamolybdate anion ($Mo_8O_{26}^{-4}$).

Compounds comprising molybdates and ammonium cation(s) may have one or more of the following properties: (i) Soluble in water, (ii) Transparent or near transparent film-forming properties on substrates when applied by coating or printing an aqueous based formulation or ink, (iii) Colorless or essentially colorless film-forming properties on substrates when applied by coating or printing an aqueous based formulation or ink, (iv) Thermal sensitivity manifested as a color change of good visual discrimination when a layer comprising the water soluble amine molybdate compound is exposed thermally imagewise by an IR bulb/mask, scanning laser or diode array, and/or heat block imaged by a thermal contact printer (v) Compatibility with at least one water compatible binder system as indicated by the formation of a near transparent film of a blend. Thus, such compounds may advantageously be used to obtain colorless and transparent coatings on substrates to be marked.

Further, compounds comprising molybdates and ammonium cation(s), when coated or printed on an inert substrate such as clear PET film or on top of a pre-printed substrate, and dried, form a continuous layer i.e. coating, that is substantially transparent to visible light and essentially colorless. Such coatings are thermally sensitive and find utility in thermographic materials and on 3D objects for imaging by IR bulbs/masks, scanning lasers, diode arrays or thermal contact printers.

Clear coatings formed by means of compositions disclosed herein may also be useful on opaque substrates because they can impart desirable gloss, as distinct from compositions containing suspended insoluble molybdates that give matt surfaces The ammonium cation comprising at least one group selected from the group consisting of OH, COOH, NH2, NHC$_{1-5}$ alkyl, N(C$_{1-5}$ alkyl)$_2$, wherein the two C$_{1-5}$ alkyl may be the type of alkyl or different, is typically an alcohol-amine, an amino-sugar, or an amino-acid.

Alcohol-amines are compounds that comprise at least one amino group and at least one hydroxyl group, such as hydroxylamine, monoethanolamine, diethanolamine, triethanolamine. Preferred alcohol-amines may be represented by the general formula (I), $$HNR1R2R3^+ \qquad \text{general formula (I)}$$

wherein R1 is C2-5 alkyleneOH; and
R2 and R3 is, independently of each other, selected from the group consisting of C2-5 alkyleneOH, hydrogen, C1-5 alkyl. An especially preferred example of alcohol-an amine is triethanolamine.

Amino-sugars, which are sugars, i.e. sacharides, e.g. mono-sacharides, in which one or more of the non-glycosidic hydroxyl groups has been replaced by an amino group. Preferred examples of amino-sugars include D-glucosamine and galactosamine.

Amino-acids are organic compounds that comprise at least one amino group and at least one carboxyl group. Preferred examples of amino-acids include: glycine and any other known amino acid.

Further, ammonium cation comprising at least one group selected from the group consisting of OH, COOH, NH2, NHC$_{1-5}$ alkyl, N(C$_{1-5}$ alkyl)$_2$, wherein the two C$_{1-5}$ alkyl may be the type of alkyl or different, may also comprise additional ionic group(s). Examples of such groups comprise quaternary nitrogen groups, sulphonate groups and carboxylate groups.

In an alternative less preferred embodiment, the ammonium cations comprising at least one group selected from the group consisting of OH, COOH, NH2, NHC$_{1-5}$ alkyl, N(C$_{1-5}$ alkyl)$_2$, wherein the two C$_{1-5}$ alkyl may be the type of alkyl or different, also other amines, may be replaced by other types of water soluble amines, such as amino-ethers and amino-polyethers, e.g. amino-PEGs. Specific examples include 2-methoxyethylamine and similar amines.

A specific example of a preferred water soluble marking compound is tetra-triethanolammonium octamolybdate (($HN(CH_2CH_2OH)_3)_4*Mo_8O_{26}$) or other molybdates obtainable by reacting molybdenum (VI) oxide with triethanolamine.

Amine molybdates, wherein the amine is an alcohol-amine, an amino-sugar or an amino-acids, such as being an alcohol-amine, may be obtained by reacting a suitable amine with a molybdenum compound, e.g. in oxidation state VI, such as molybdenum trioxide, molybdic acid, ammonium dimolybdate, ammonium heptamolybdate, ammonium octamolybdate, sodium molybdate or commercial "molybdic acid" (which comprises primarily one or more ammonium molybdates). Typically, the amine and the molybdenum compound are added to an aqueous being mildly acidic, e.g. having a pH of about 5. The mixture may be heated for some time, i.e. less than an hour up to 24 hours. Subsequently, excess of an water miscible organic solvent, such as C2-C5 alkanol, e.g. isopropylalcohol, may be added to cause precipitation of the formed compound comprising molybdate and at least one ammonium cation comprising at least one group selected from the group consisting of OH, COOH, NH2, NHC$_{1-5}$ alkyl, N(C$_{1-5}$ alkyl)$_2$, wherein the two C$_{1-5}$ alkyl may be the same type of alkyl or different alkyls. The precipitated may then be separated.

An embodiment relates to a process of obtaining a compound comprising a molybdate and triethanolammonium. In such a method, molybdenum (VI) oxide and triethanolamine may be added to a slightly acidic aqueous solution of ammonium chloride. It is not necessary to ad the ammonium chloride before the other additives. The aqueous solution, to which molybdenum (VI) oxide and triethanolamine is added, may be slightly heated, i.e. having a temperature of 30-40° C. Subsequently to the addition, the temperature may be raised to 85 to 100° C. After the 1 to 5 hours, the temperature may be lowered to 35 to 45° C. and the mixture may be added to an excess (volume vs. volume) of a water miscible organic solvent, such as a C2-C5 alkanol, eg. isopropylalcohol. After thoroughly stirring of the mixture at elevated temperature, e.g. about 35 to 45° C., it may be left unstirred at room temperature, such as about 20° C., to allow for precipitation of crystals of a compound comprising a molybdate anion and triethanolammonium. In order to promote formation of crystals, the mixture may be cooled to 0 to 10° C. Subsequent to crystallization, the solvent may be removed. Typically, the solvent is removed by filtration. The crystals may then be dried. They may be dried under vacuo and/or slightly elevated temperature, e.g. 40 to 50° C. Further, in EP 0 015 496, a procedure for obtaining amino molybdates is described. A similar procedure may be used to obtain compounds disclosed herein.

In addition, an embodiment relates to a compound obtainable by such process as described above.

Another embodiment relates to a composition comprising a water soluble marking compound as disclosed herein and a solvent. Typically, although not necessary, the solvent is an aqueous solvent. The aqueous solvent may consist of only water. However, it may also comprise one or several water-miscible organic solvent(s).

Examples of such water-miscible organic solvent include C1-4-alkanols, C2-4-polyols, C3-6-ketones, C4-6-ethers, C2-3-nitriles, nitromethane, dimethylsulfoxide, dimethylformamide, dimethylacetamide, methyl pyrolidone and sulfolane, whereby C1-4-alkanols and C2-4-polyols may be substituted with C1-4-alkoxy groups.

Examples of C1-4-alkanols are methanol, ethanol, propanol, isopropanol or butanol, isobutanol, sec-butanol and tert-butanol.

Examples of a C1-4-alkoxyderivatives thereof are 2-ethoxyethanol and 1-methoxy-2-propanol. Examples of C2-4-polyols are glycol and glycerol.

Examples of C3-6-ketones are acetone and methyl ethyl ketone. Examples of C4.6-ethers are dimethoxyethane, diisopropylethyl and tetrahydrofurane.

An example of a C2-3-nitrile is acetonitrile.

Preferably, the water-miscible organic solvent is selected from the group consisting of C1-4-alkanols, C2-4-polyols, C3-6-ketones, dimethylformamide and dimethylacetamide, whereby C1-4-alkanols and C2-4-polyols may be substituted with C1-4-alkoxy groups.

Further, the composition may typically comprise a water-soluble or water-dispersable polymeric binder. The binder may be one or more of a range of water-soluble or amine-stabilised aqueous emulsion polymers suitable for use in water-based coating or ink formulations. As an example acrylic polymers may be used.

The herein disclosed water soluble marking compound may be caused to change color by use of laser radiation having a wavelength of about 10 µm. Such laser light may be provided by mid-IR CO$_2$ lasers with an emission wavelength in the range 10,000 nm to 12,000 nm. However, mid-IR CO$_2$ lasers are less suitable for installation into existing production lines due to their physical bulk size. An NIR fiber laser may have a small print-head fitted to the production line, connected to the laser, several meters away, via an umbilical cord. Thus, said disadvantage may be overcome by use of NIR (near infra-red) laser.

In order to allow for use of NIR-lasers, the composition may comprise a light absorbing agent that absorbs light in the wavelength range 700 nm to 2500 nm, i.e. NIR-absorbers. The light absorbing agent may convert the absorbed near infra-red laser irradiation into conductive heat. Thus, NIR-lasers may be used to change color of the composition. Accordingly, the composition may further comprise a light absorbing agent that absorbs light in the wavelength range 700 nm to 2500 nm to allow for use the composition in NIR-laser printing applications.

The light absorbing agent may be selected from the group consisting of organic dyes/pigments, inorganic pigments, e.g. copper (II) hydroxyl phosphate, non-stoichiometric inorganic pigments, and conductive polymers.

Organic Dye/Pigment Types.

These types of light absorbing agents comprise, but are not limited to: families of metallo-porphyrins, metallo-thiolenes, such as nickel, platinum and palladium dithiolenes, and poly-thiolenes, metallo-phthalocyanines, aza-variants of these, annellated variants of these, pyrylium salts, squaryliums, croconiums, amminiums, diimoniums, cyanines and indolenine cyanines. Examples of organic dyes that may be used in the present invention are taught in U.S. Pat. No. 6,911,262, and are given in Developments in the Chemistry and Technology of Organic dyes, J Griffiths (ed), Oxford: Blackwell Scientific, 1984, and Infrared Absorbing Dyes, M Matsuoka (ed), New York: Plenum Press, 1990. Further examples of the NIR dyes or pigments of the present invention can be found in the Epolight™ series supplied by Epolin, Newark, N.J., USA; the ADS series supplied by American Dye Source Inc, Quebec, Canada; the SDA and SDB series supplied by HW Sands, Jupiter, Fla., USA; the Lumogen™ series supplied by BASF, Germany, particularly Lumogen™ IR765, IR788 and IR1055; the Pro-Jet™ series of dyes supplied by FujiFilm Imaging Colorants, Blackley, Manchester, UK, particularly Pro-Jet™ 830NP, 900NP, 825LDI and 830LDI; the Filtron™ products supplied by Gentex Corp of Carbondale, Pa., and those sold by Few Chemicals GmbH of Bitterfeld-Wolfen, Germany. An example of an NIR dye particularly suitable for use with lasers with an emission wavelength in the range 1,000 nm to 1,200 nm is N,N,N',N'-tetrakis(4-dibutylaminophenyl)-p-benzoquinone bis(iminium hexafluoroantimonate).

Stoichiometric Inorganic Pigment Types.

These types of light absorbing agents comprise, but are not limited to oxides, hydroxides, sulfides, sulfates, borides, nitrides and phosphates of metals such as copper, bismuth, iron, nickel, tin, indium, zinc, manganese, zirconium, tungsten, titanium, lanthanum, and antimony. Also included are coated micas known as Iriodin products supplied by MERCK, mixed metal oxides such as antimony tin oxide and tungsten bronzes. Copper salts are particularly preferred and the most preferred copper salt is copper (II) hydroxyl phosphate.

Non-Stoichiometric Inorganic Pigment Types.

Non-stoichiometric refers to the ratio of elements in the compound not being integers. For a typical metal oxide, the compound can be reduced where there is a deficiency of oxygen, or oxidized where there is a deficiency of metal. Suitable non-stoichiometric compounds comprise, but are not limited to: non-stoichiometric oxides, hydroxides, sulfides, sulfates, borides, nitrides and phosphates of metals such as copper, bismuth, iron, nickel, tin, indium, zinc, manganese, zirconium, tungsten, titanium, lanthanum, and antimony. Also included are non-stoichiometric mixed metal oxides, and doped metal oxides. Particularly preferred examples include non-stoichiometric titanium nitride, zinc oxide, antimony tin oxide, tungsten oxide, and indium tin oxide. The most preferred non-stoichiometric compound is reduced or blue indium tin oxide. The term non-stoichiometric also includes doped metal compounds, such as doped metal oxides. Examples include aluminum doped zinc oxide and fluorine doped tin oxide and tin doped indium oxide.

Conductive Polymers.

Conductive polymers are materials that, in the polymerized state, comprise linked monomers (typically rings) that are conjugated and which can therefore allow delocalization/conduction of positive or negative charge. The conjugation allows an absorption shift that can be controlled such that it applies to the wavelength of irradiation, and which may also depend on the concentration of the polymer. Examples of monomers that can be conjugated to give suitable conducting polymers are aniline, thiophene, pyrrole, furan and substituted derivatives thereof. Such polymers, in addition to providing the desired means of transferring heat from a low-power laser, have the advantage that they do not readily diffuse out of the coating material. They can also act as the polymer binder. Yet another advantage of such materials is that they can be colorless, even at high loading (up to 5% by weight); this is by contrast to monomeric species that have been used, such as phthylocyanine, which absorb at about 800 nm but give the composition a greenish tinge, even at a loading of 0.1 wt %. Examples of conducting polymer products suitable for use in the present invention include: Baytron (Bayer), Clevios (HC Starck) and Orgacon (Agfa) products that are known to comprise PSS/PEDOT.

Further examples of other suitable NIR absorbers are taught in WO2005/012442, WO2005/068207, WO2007/141522 and WO2008/050153.

The most preferred NIR absorbers are those that have an essentially negligible impact on the color of the coating, and on the transparency of the coating. It is also preferred that the absorbance profile of the absorber matches the emission profile of the light/laser source, this gives rise to low fluence imaging. It is preferable to make the transparent coating imageable with a near infrared light source, such as a NIR laser or diode array system, regardless of whether it has been over laminated or not.

According to an embodiment the NIR absorber may be reduced or blue indium tin oxide nanopowder. It is preferred that reduced or blue indium tin oxide is used in combination with a light source with an emission wavelength at approximately 1,500 nm. A 1,550 nm NIR laser is a particularly preferred example. Reduced or blue indium tin oxide, in combination with a 1,550 nm NIR laser, may be used at concentration <5 wt %. The coat weights may be less than 10 $g/m^2$. At these parameters the transparent coatings are essentially colorless as well as mostly transparent, but have strong 1,550 nm NIR absorbance and give rise to low fluence laser imaging. The presence of an NIR absorber in the transparent coating does not usually have a negative effect on its CO2 laser imageability, indeed CO2 laser imageability is often enhanced by the presence of a NIR absorber as the absorber often helps to transform the CO2 laser radiation into conductive heat.

As an example, the composition may comprise 5 to 95 wt. %, of an aqueous-based solvent and 5 to 50 wt. % of the marking compound disclosed herein. The aqueous-based solvent may comprise at least 10 wt % water, preferably at least 50 wt %, such as at least 75 wt %, or at least 95 wt %, water.

It will be appreciated by one of ordinary skill in the art that it is possible to incorporate additives of various sorts in the imaging layers, and which might be beneficial in certain circumstances. Such additives include, for example, polymer binders, mild reducing agents to promote thermal printer performance, colorants such as dyes or pigments, light stabilizing agents such as UV-absorbers and hindered amine light stabilizers (HALS), antioxidants and other known stabilisers, pH buffers, acid and base scavengers, antiblocking materials such as talc or selected silicas, and materials adsorbent to or reactive with any thermolysis products of laser imaging, surfactants, adhesion promoters, dispersing aids, inks flow/rheology modifiers, humectants, slow drying solvents, fast drying solvents, biocides and the like.

An additive of particular utility, in solution or suspension or in a separate layer, is an electron-donating dye precursor often known as a color-former or leuco dye. When the amine molybdate compounds disclosed herein are incorporated in a layer with such color-formers and thermally imaged, e.g. using a $CO_2$ laser, colored images may be obtained. The color may correspond to that obtained by the use of common color developers such as certain phenols. Weak block images may also be obtained, e. g. using a heat sealer at 100-120 C and contact times of 1-10 seconds. Thus the amine molybdate acts as an electron acceptor and color developer for at least some of these color-formers. The low melting point of amine molybdates means that they can be fused with color-formers, if desired.

Another embodiment relates to a substrate coated with the composition disclosed herein. By use of the composition, substrates, or parts of substrates, may be imageable. As example packages may be provided with date-of-packing in simple manner, although the packaging material have been produced elsewhere and already is laminated. The composition may be applied by any known printing or coating process suitable for aqueous based inks such as flood coating, flexography, gravure etc. The dry coat weight may be in the range 0.1 to 20 $g/m^2$, such as 0.5 to 10 $g/m^2$, or 1 to 5 $g/m^2$.

The transparent composition disclosed herein may be applied to flexible transparent substrates such as polymer films including: PET, PP, BOPP, PE and cellulose based films, to produce essentially transparent and colorless substrates capable of being imaged using an IR bulb/mask, scanning laser, diode array or direct contact thermal printer. The transparent composition may also be applied to opaque flexible substrates such as pigmented polymer films, paper, corrugated card board, textiles etc. and imaged using an IR bulb/mask, scanning laser, diode array or direct contact thermal printer. It is particularly preferred to apply the transparent coatings to pre-printed substrates that comprise, e.g. text, logos, graphics and machine readable codes such as 1-D barcodes, 2-D data matrix codes, high capacity data codes and the like. This allows images to be created in the coating layer using an IR bulb/mask, scanning laser, diode array or direct contact thermal printer, but due to its highly transparent and essentially colorless nature the un-imaged layer has only a negligible effect on the appearance of the underlying pre-printed substrate, and thus has essentially no effect on the readability of the text, logos, graphics and machine readable codes such as 1-D barcodes, 2-D data matrix codes, high capacity data codes and the like on the pre-printed substrate.

The transparent composition may be applied directly to ridged substrates such as 3-D objects made from, e.g. glass, plastic or paper/card etc., e.g. containers suitable for the storage of solids or liquid products, particularly solid or liquid foodstuffs.

According to an embodiment, the substrate to be coated with a composition disclosed herein may be paper, cardboard, corrugated paper board, plastic film, ridged plastic parts, textile, wood, metal, glass, leather, foodstuff or a solid pharmaceutical composition.

The transparent coating may be applied to various substrate used in the printing or packaging industry which includes: clear and opaque polymer films made from PE, BOPP, PET and cellulose based films, cellulose pulp substrates such as paper and corrugated card board, foil, glass, metals, textiles, foodstuffs and pharmaceutical unit dose preparation or pills, and the like. The transparent, imageable coated substrate may be used to make items such as self-adhesive labels, packaging for food and non-food products, 3-D items such as containers for solid or liquid products including food containers, and documents such as newspaper, magazines and addressed envelopes. The water based, transparent, imageable composition may be applied to the whole of the substrate/packaging which makes the substrate/packaging suitable for use in mass customization, or it may be applied as a patch on to a relatively small portion of the substrate/packaging. The patch may then be imaged to give human readable date and lot code information and machine readable codes such as 1-D barcodes and 2-D data matrix codes and high data capacity barcodes.

Further, the substrate, to which the transparent composition has been applied to, may also comprise any substances known in the manufacture of substrates suitable for use in printing or packaging applications. These substances may exist either within the substrate or on the surface of the substrate. Examples include a layer of clay coating on the substrate surface and barrier layers made from e.g. PE or aluminum and the like.

As well as being applied to a substrate as a coating, the marking compounds disclosed herein may also be incorporated directly into a substrate. They for example be co-extruded into polymer films or co-molded into plastic articles, or added directly into paper or card, e.g. added to paper pulp at the sizing stage.

A substrate coated with the composition disclosed herein may be over laminated. This may be done to protect the imageable layer or to impart other properties to the substrate such as impermeability. The over lamination process may be done as a coating finish or by extruding a molten polymer, such as e.g. PE as a thin film, over the surface coated with the composition disclosed herein. According to an embodiment, a substrate coated with the composition disclosed herein, may over laminated. The substrate may be over laminated by a polyolefin, such as polyethylene.

In embodiments, wherein substrates coated with the composition are to be over laminated it is preferred if the marking compound not undergoes any discoloration during the over lamination process. Particularly where the over lamination process is polymer extrusion.

A further embodiment relates to a process for marking a substrate. In such a process, the substrates to be marked, or parts of it, may be coated with a composition disclosed herein. Examples of substrates have been provided herein above. In order to have the marking compound change color and thereby provide a mark, those parts of the coated substrate, where a marking is intended, may be exposed light in the wavelength range from 100 nm to 20,000 nm. Thereby a mark may be generated. The light may be supplied in various ways. Although a bulb/mask arrangement may be used, use of lasers, diodes, or diode array systems is preferred.

$CO_2$ lasers operating in the wavelength range 10,000 nm to 11,000 nm, or NIR-lasers, diodes or diode array systems operating in the wavelength range 700 to 2500 nm may be used.

Further, in a process for marking a substrate, also non-contact heat, or contact heat supplied using a thermal printer may be used to obtain a marking.

As indicated above, a marking, such as an image may be formed by the application of heat. The heat may be applied by a thermal contact printer, a hot air source such as a heat gun or the heat may be applied in the form of photonic energy from a suitable light source.

Preferably, the heat is applied locally, on irradiation with a suitable light source, which may be a non-coherent or coherent light source. The light source may be mono-chromatic or broadband.

Particularly preferred, mono-chromatic and coherent light sources are lasers. Suitable lasers may have an emission wavelength in the range 100 nm to 20,000 nm. The laser may be a continuous wave or pulsed laser.

Examples of suitable lasers include UV lasers (<400 nm), visible band lasers (400 nm to 700 nm), Nd:YAG lasers/NIR fiber lasers (700 nm to 2,500 nm), and mid-IR $CO_2$ lasers with an emission wavelength in the range 10,000 nm to 12,000 nm.

Lasers typically apply light to a substrate using a steered beam system. However, a mask arrangement may also be used.

Other light sources include diodes, diode arrays, fiber coupled diode arrays and bulb/mask arrangements. Diode array systems, which may emit both coherent and non-coherent light, are particularly suitable for use in high speed continuous or 'on the fly' imaging.

Where a substrate coated with a composition disclosed herein have been over laminated, it is preferred to use a light source that emits light that will not be absorbed by the over laminate. Particularly preferred examples are Nd:YAG lasers/NIR fiber lasers operating with an emission wavelength in the near infrared range, i.e. 700 nm to 2,500 nm. However, as already outlined, in order to utilize such wavelengths the composition it is preferred if the composition further comprises a substance capable of absorbing near infrared light and converting it into conductive heat.

Another embodiment relates to a marked substrate. Such a marked substrate is obtainable as just described.

In addition to comprising a marking compound comprising a transition metal oxyanion and at least one ammonium cation, the composition may comprise one or several further marking compound(s). Examples of such other marking compounds include char forming compounds and other types of marking compounds known with the art. Examples of further marking compounds are provided below.

Char forming compounds are those that on heating form a colored char; typically brownish or blackish. Preferred examples of char forming compounds include polyhydroxy compounds selected from the group consisting of carbohydrates such as monosaccharides, disaccharides and polysaccharides, and derivatives thereof wherein the carbonyl group has been reduced to a hydroxyl group, so-called sugar alcohols.

Examples monosaccharides are the sugars: glucose, mannose, galactose, arabinose, fructose, ribose, erythrose and xylose. Examples of disaccharides are the sugars: maltose, cellobiose, lactose and sucrose. Examples of polysaccharides are cellulose, starch, gum arabic, dextrin and cyclodextrin. Examples of sugar alcohols are meso-erythritol, sorbitol, mannitol and pentaerythritol. More preferred polyhydroxy compounds are disaccharides, polysaccharides and sugar alcohols.

Most preferred polyhydroxycompounds are sucrose, gum arabic and meso-erythritol. When a polyhydroxy compound can exist as the D-enantiomer, the L-enantiomer or the racemate, all these three forms are comprised. Optionally a salt can be added to assist char formation, examples include sodium borate, ammonium sulphate, ammonium phosphates, sodium carbonate and sodium bicarbonate.

In addition to char forming compounds also other marking compounds known with the art may be added to the composition comprising a transition metal oxyanion and at least one ammonium cation. Examples of such other marking compounds taught in WO2007/045912, WO2002/068205, WO2006/129078, WO2010/026407, WO2002/074548, GB2447659, WO2004/043704, WO2006/018640, WO2007/063339, WO2010/029331, WO2010/029329, WO2006/051309, WO2009/093028, WO2010/001171, WO2010/049282, WO2010/049281, WO2010/045274, WO2009/010405, WO2009/010393, WO2008/107345, WO2008/110487, WO2008/083912, WO2008/055796, WO2007/088104, WO2007/031454, WO2007/012578, WO2006/108745 and WO2006/067073.

According to an embodiment, the composition comprising a transition metal oxyanion and at least one ammonium cation may also comprise pigments. Pigments may be water-dispersible inorganic or organic additives such as calcium carbonate etc. One or more of a range of additives may be utilized, including surfactants or lubricants such as zinc stearate etc.

Compounds comprising a transition metal oxyanion and at least one ammonium cation, are also suitable for formulation into non-aqueous or organic solvent based coating systems, where they form a dispersion or suspension, which can be applied to a substrate using any coating or printing process suitable for organic solvent based inks, such as Gravure printing, tampo printing, UV flexo printing reverse gravure, spin coating and the like.

Without further elaboration, it is believed that one skilled in the art can, using the preceding description, utilize the present invention to its fullest extent. The preferred specific embodiments described herein are, therefore, to be construed as merely illustrative and not limitative of the remainder of the description in any way whatsoever. Further, although the present invention has been described above with reference to specific embodiments, it is not intended to be limited to the specific form set forth herein. Rather, the invention is limited only by the accompanying claims and, other embodiments than the specific above are equally possible within the scope of these appended claims, e.g. different than those described above.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous.

In addition, singular references do not exclude a plurality. The terms "a", "an", "first", "second" etc do not preclude a plurality.

Experimental

The following examples are mere examples and should by no mean be interpreted to limit the scope of the invention. Rather, the invention is limited only by the accompanying claims.

All chemicals and reagents were standard laboratory grade and were purchased from Sigma-Aldrich.

Example 1

Water Soluble Amine Molybdate compound (TEA-OM)

Water (3000 ml) was magnetically stirred in a 5 L round bottomed flask and heated to 37° C. To the heated water was added molybdenum (VI) oxide (500 g, 3.47 mol), ammonium chloride (276.85 g, 5.18 mol) and triethanolamine (955 g, 6.4 mol). The reaction mixture was heated to 90° C. over 90 minutes and then allowed to self-cool to 40° C. over 3 hours. The cooled reaction mixture was then poured into a 10 L vessel containing isopropyl alcohol (6000 ml). The mixture was stirred thoroughly for and then left to stand overnight at 20° C. The next morning large white crystals had formed. The reaction mixture liquor was decanted and the crystals filtered under vacuum and then dried in an oven at 45° C. to yield tetra-triethanolammonium octamolybdate (TEA-OM; 4(HN$(CH_2CH_2OH)_3)^{+1}$*$Mo_8O_{26}^{-4}$) 535.5 g (69%), having a melting point of 144° C.

The crystals did readily dissolve in water to give a colourless solution.

Example 2

Aqueous Ink Comprising TEA-OM and Reduced Indium Tin Oxide

An ink formulation was made comprising (amount gives refers to wt %):

| | |
|---|---|
| 1. Induprint 281 (aqueous binder) | 30.0 |
| 2. Glascol LS2 (aqueous binder) | 14.2 |
| 3. Agitan 350 (surfactant) | 0.5 |
| 4. Tyzor LA (adhesion promoter) | 0.5 |
| 5. DEG (retarder) | 2.0 |
| 6. r-ITO (NIR absorber) | 2.5 |
| 7. TEA-OM (marking compound; cf. Ex. 1) | 50.0 |
| 8. Aerosil 200 (dispersing aid) | 0.3 |

Example 3

Application of the Inks Prepared in Examples 2 to Substrates

The ink formulation prepared in example 2 was applied to the following substrates using an RK Print proofer fitted with a K2 bar delivering a coat weight of approximately 6 to 8 g/m$^2$.

Untreated white paper
Clay coated white paper
Clear PET (polyethyleneteraphthalate) film
White PET film
Clear BOPP (bi-axially oriented polypropylene) film
White BOPP film

Example 4

PE Over Lamination of the Printed Substrates

The printed substrates were over laminated by extruding a thin layer of polyethylene over the surface.

Example 5

Laser Imaging of the Substrate

All substrates were imaged using:
1. A 30 W $CO_2$ laser operating with an emission wavelength of 10,600 nm.
2. A 10 W NIR laser operating with an emission wavelength of 1,550 nm.

Results

Black images were obtained on all of the substrates tested upon laser irradiation The data shown below (cf. Table 1 and 2, respectively) is for the clay coated paper substrate, both unlaminated and laminated prior to laser imaging.

TABLE 1

Imaging with $CO_2$ laser

| Fluence (J/cm$^2$) | Optical density Unlaminated | Laminated |
|---|---|---|
| 0 | 0 | 0 |
| 1.66 | 0.49 | 0.08 |
| 2.38 | 1.16 | 0.38 |
| 3.12 | 1.54 | 1.29 |
| 4.6 | 1.27 | 1.34 |
| 6.06 | 1.01 | 1.21 |

TABLE 2

Imaging with 1550 nm laser

| Fluence (J/cm$^2$) | Optical density Unlaminated | Laminated |
|---|---|---|
| 0 | 0 | 0 |
| 0.55384 | 0 | 0 |
| 0.913836 | 0.02 | 0 |
| 1.321304 | 0.26 | 0 |
| 1.843496 | 0.36 | 0.08 |
| 2.326128 | 0.51 | 0.25 |
| 2.674256 | 0.78 | 0.29 |
| 3.192492 | 0.99 | 0.57 |
| 3.524796 | 1.09 | 0.65 |
| 3.952044 | 0.91 | 1.12 |
| 4.367 | 0.8 | 1.26 |

It is to be noted that the $CO_2$ laser had caused noticeable disruption to the PE over laminate film. In contrast there was no observed damage to the PE over laminate film caused by the 1550 nm laser. This further demonstrates the advantage of using NIR light sources in imaging through laminate films.

Further, use of isolated TEA-OM in imageable formulations, rather than addition of triethanolamine to formulations comprising $MoO_3$, was found to provide superior imageability (optical density of 1.04 compared to 0.37 at a fluency of 3.192 J/cm$^2$).

Furthermore, addition of triethanolamine to imageable formulations comprising AOM had detrimental effect of the flow properties, i.e. the rheological properties. Thus, such formulations may not be coated on substrates using standard techniques within the art, e.g. by a RK Print proofer fitted with a K2 bar.

The invention claimed is:

1. A process of obtaining a clear laser imageable aqueous composition comprising a compound and an aqueous solvent, said compound comprising:
    (i) a transition metal oxyanion of formula $AO_xO_y^{z-}$,
      wherein "x" is an integer of 1 to 18; "y" is an integer of 4 to 42; "z" is an integer of 1 to 12; and
      "A" is Mo (molybdenum) wherein the oxyanion is $Mo_8O_{26}$;
    (ii) at least one-ammonium cation(s) which is an alcoholamine represented by $HN(CH_2CH_2OH)_3$;

$$HNR1R2R3^+ \qquad (I)$$

(iii) one or several $NH_4^+$ cations; and
    (iv) one or several molecules of water, the process comprising:
    adding molybdenum (VI) oxide, ammonium chloride, and triethanolamine to an aqueous solvent;
    heating the resulting mixture;
    adding the heated mixture to a water miscible organic solvent;
    precipitating crystals of a compound that is tetra-triethanolammoniumoctamolybdate $((HN(CH_2CH_2OH)_3)_4 * Mo_8O_{26})$; and
    isolating said crystals.

2. A clear laser imageable aqueous composition obtainable by the process according to claim 1.

3. The composition according to claim 2, wherein the molybdenum oxyanion is a molybdate (VI) anion.

4. The composition according to claim 2, comprising a water-soluble or water-dispersable polymeric binder.

5. The composition according to claim 2, further comprising a light absorbing agent that absorbs light in the wavelength range 700 nm to 2500 nm.

6. The composition according to claim 5, wherein the light absorbing agent is reduced indium tin oxide.

7. The composition according to claim 2, wherein said composition comprises 5 to 95 wt. % of the said aqueous solvent and 5 to 50 wt. % of the said compound.

8. The process according to claim 1, wherein said water miscible organic solvent comprises a C2 to C5 alkanol.

9. The process according to claim 8, wherein said C2 to C5 alkanol is isopropyl alcohol.

* * * * *